United States Patent [19]
Dill et al.

[11] Patent Number: 5,622,464
[45] Date of Patent: Apr. 22, 1997

[54] SCREW WITH INCREASED DRIVING RESISTANCE AT PROPER DEPTH

[75] Inventors: Michael C. Dill, Elk Grove Village; James W. McElderry, Schaumburg; Juergen O. Rathgeber, Arlington Heights, all of Ill.

[73] Assignee: Illinois Tool Works Inc., Glenview, Ill.

[21] Appl. No.: 517,981

[22] Filed: Aug. 22, 1995

[51] Int. Cl.⁶ .................................................. F16B 23/00
[52] U.S. Cl. .......................... 411/399; 411/387; 411/369; 411/371
[58] Field of Search ....................... 411/386, 387, 411/399, 402, 403, 919, 368, 414, 371, 369, 184, 542

[56] References Cited

U.S. PATENT DOCUMENTS

| | | | |
|---|---|---|---|
| 3,452,636 | 7/1969 | Cohen et al. | 411/369 |
| 3,661,046 | 5/1972 | Waud et al. | 411/369 |
| 4,295,767 | 10/1981 | Temple, Jr. | 411/377 |
| 4,373,842 | 2/1983 | Bettini et al. | 411/377 |
| 4,460,300 | 7/1984 | Bettini et al. | 411/375 |
| 4,516,893 | 5/1985 | Barth | 411/184 |
| 4,518,294 | 5/1985 | Barth | 411/188 |
| 4,621,963 | 11/1986 | Reinwall | 411/369 |
| 4,705,441 | 11/1987 | Arnold | 411/188 |
| 4,749,321 | 6/1988 | Knohl et al. | 411/371 |
| 4,764,066 | 8/1988 | Terrell et al. | 411/399 |
| 4,820,235 | 4/1989 | Weber et al. | 411/399 |
| 4,875,818 | 10/1989 | Reinwall | 411/369 |
| 4,948,318 | 8/1990 | Nottelmann et al. | 411/377 |
| 4,948,319 | 8/1990 | Day et al. | 411/377 |
| 5,141,375 | 8/1992 | Pollizzi | 411/369 |
| 5,156,509 | 10/1992 | Wu | 411/369 |
| 5,188,495 | 2/1993 | Jones, Jr. | 411/369 |
| 5,199,839 | 4/1993 | DeHaitre | 411/387 |
| 5,304,023 | 4/1994 | Toback et al. | 411/387 |
| 5,338,141 | 8/1994 | Hulsey | 411/375 |
| 5,487,633 | 1/1996 | Roberts | 411/387 |

Primary Examiner—Steven N. Meyers
Assistant Examiner—Tuyet-Phuong Pham
Attorney, Agent, or Firm—Schwartz & Weinrieb

[57] ABSTRACT

A screw for use with a washer as a sealing fastener having formations near the head of the screw to increase driving resistance when the portion having the formations reaches a surface into which the screw is being drilled. The screw includes a shank with a tip end and a head end. A head at the head end may be driven by a driving tool such as a pneumatic or electric drill. To facilitate retention of the washer the head has a flange that forms a recess. The shank has an enlarged portion near the head adjacent to the recess and the enlarged portion has ridges. The enlarged portion, including the ridges, increases the driving resistance of the screw. This increase in resistance gives notice to an operator of the driving tool that an appropriate driving depth and torque have been achieved. Preferably, the washer has an inner diameter surface with fully radiused projections. The projections assist in mounting the washer to the screw and keeping the washer appropriately positioned on the screw during driving of the screw.

23 Claims, 1 Drawing Sheet

SCREW WITH INCREASED DRIVING RESISTANCE AT PROPER DEPTH

FIELD OF THE INVENTION

The present invention relates generally to a sealing fastener including a screw for use with a washer. More particularly, the present invention relates to a screw which is used to fasten a panel or sheet to an underlying substrate or support wherein the screw and washer must also provide a reliable seal in combination with the panel or sheet that the screw fastens to the underlying substrate or support.

BACKGROUND OF THE INVENTION

Conventional screws, often used with washers, are used to fasten sheets, panels, studs and other similar materials. An example of a typical application using a screw involves the installation of a panel roof. Such a roof typically comprises overlapping metal panels, or panels made of substances similar to metal. Of course, many applications of screws and screw/washer combinations are possible, such as the installation of panel walls or the assembly of appliances utilizing panels, an example of which is a refrigerator.

The application to a roof serves to emphasize an important function of a screw and washer combination. Of course, one major function of a screw is to fasten. However, when used with a washer for fastening roof panels, another important function of the screw is to create a seal around the aperture through which the screw passes.

If an appropriate seal is not created when the screw is driven into the panel to fasten it upon a roof, an opportunity is presented for moisture to penetrate the roof panel at the area immediately surrounding the screw. The penetration of moisture through the roof panel compromises the integrity of the roof and its ability to act as an effective moisture barrier. Moreover, the penetration of moisture around the screw may lead to corrosion around the screw. In turn, the corrosion could lead to failure of the screw as a fastener and as a seal. Thus, in the case where an adequate seal is not created by the screw with the washer, both the ability of the roof to act as a moisture barrier and its structural integrity might be adversely affected.

One of the causes of failure of a screw and washer combination, whether in a roofing or other application, is improper installation. Typically, screws are installed through operator use of a driving tool, such as an electric, manual, or pneumatic drill. The driving tool is used to drive the screw into a sheet or panel so that the lower portion of the screw head traps the washer between the screw head and the sheet or panel. The washer, in combination with the screw head and the surface of the sheet or panel, creates a seal when the washer is properly positioned and trapped between the screw head and the sheet or panel.

However, for the seal to be effective, an appropriate amount of pressure must be exerted upon the washer by the screw head. Either too little or too much pressure exerted upon the washer may reduce the ability of the washer to provide an effective seal. Insufficient pressure leaves gaps through which moisture may pass. Excessive pressure may fracture the washer by forcing it against an extrusion of the panel or sheet which is created by driving the screw into the panel or sheet. Alternately, excessive pressure may cause overcompression of the washer which causes it to spread radially beyond the fastener head, causing excessive stress and ultraviolet degradation, ultimately resulting in seal failure or leaks. Also, in some roofing systems, the same fasteners are also used to secure lapped sheet material. The proper amount of fastener pressure on these sheets helps maintain fastening integrity as well as an effective seal.

Addressing this concern, some known driving tools and installation techniques utilize torque or depth setting attachments in combination with the driving tool. The torque setting attachment allows driving of the screw until a predetermined torque value is reached. The depth setting attachment allows driving of the screw until a given depth is reached. Ideally, the predetermined amount of torque or depth results in an amount of pressure upon the washer which maximizes its ability to effectively function as a seal and prevent overdriving and premature failure due to overtorquing a fastener of a predetermined size (that is, attaining its maximum setting torque).

However, in practical terms, the use of a torque setting or similar attachment may not be efficient as a result of the installation environment. Installation typically takes place on construction sites or in manufacturing facilities, and an operator controls the driving tool used to drive the screw into the panel or sheet. The operator is frequently subject to production pressures such as completion deadlines and quotas. In many instances, the operator finds the depth or torque setting attachment to be a cumbersome device which adversely affects the ability of the operator to quickly perform the fastening task. For this reason, the operator may choose to remove the setting attachment. The failure to use a setting attachment may impair the effectiveness of the seal or the integrity of the screw itself, since too little or too much pressure may be placed on the washer by the screw, as discussed above.

Another potential defect in the seal arises from the positioning of the washer with respect to the screw and the integrity of the washer itself. Known washers include generally angular protrusions on the inner diameter surface of the washer. A function of the protrusions is to allow the washer to be easily attached to the screw. The protrusions also hold the washer in place, for example, attached to the screw prior to installation of the screw.

Another function of these protrusions is to maintain the generally centered position of the washer around the shank of the screw at a position beneath the head of the screw when the screw and washer are assembled, as well as during the driving of the screw. If the screw was mounted in a final position in an off-center position, the seal on one side of the screw may be adversely affected.

Such off-centering problems are frequently caused by the angular nature of the protrusions on the inner diameter surface of the washer. The edges of the angular protrusions have a tendency to catch the screw and threads and tear during mounting of the washer to the screw and during driving of the screw into a panel or sheet. If one of the protrusions is torn, the washer may not remain centered during driving of the screws. The catching and tearing may also lead to tearing of the entire washer which prevents the washer from functioning properly.

Thus, there is a need for a screw for use with a washer which acts as an effective fastener and seal, even when a depth or torque setting attachment is not used in combination with a driving tool by an operator. Additionally, there is a need for a screw with a washer which is easily attached and held on the screw, and which reliably maintains its position during driving of the screw while resisting catching and tearing.

OBJECTS OF THE INVENTION

It is therefore an object of the present invention to provide an improved screw for use with a washer which allows for reliable installation even under adverse installation conditions.

Another object of the invention is to provide an improved screw for use with a washer which allows an operator to accurately drive the screw to a desired depth so as to exert an appropriate amount of pressure against the washer by using a driving tool, even when a depth or torque setting attachment is not used with the driving tool.

A further object of the invention is to provide an improved screw for use with a washer which exhibits increased driving resistance when a predetermined depth is reached.

Yet another object of the invention is to provide an improved screw with a shank having an enlarged portion near the head of the screw, the enlarged portion having ridges which impede the driving of the screw when the enlarged portion contacts a surface into which the screw is being driven.

A still further object of the invention is to provide an improved screw for use with a washer which maintains centering of the washer with respect to the screw shank during driving of the screw.

It is an additional object of the invention to provide an improved screw for use with a washer that resists tearing of the washer during mounting of the washer to the screw and also during driving of the screw into a surface.

A further additional object of the invention is to provide an improved screw for use with a washer which includes a flange for retaining the washer while exerting an appropriate amount of pressure on the washer.

SUMMARY OF THE INVENTION

In order to achieve the foregoing objects, the present invention provides a screw for use with a washer which allows an operator to accurately drive the screw to a given depth so that a desired amount of pressure is exerted upon the washer, without the use of a depth or torque setting attachment. A washer is preferably provided for use with the present invention screw, and features at least one projection configured for maintaining the washer in a centered position relative to the screw.

Preferably, the screw has an elongated shank with a tip at one end and a head at the other end. The tip is preferably shaped to provide for self tapping or drilling. The head is configured to be driven by a driving tool, such as a drill. Threads are provided along a substantial portion of the shank. Additionally, the shank has an enlarged portion near the head, preferably being frusto-conical in shape. The enlarged portion includes impediments preferably in the form of ridges on its surface. These impediments, in combination with the enlarged portion, increase the driving resistance of the screw when the enlarged portion and the impediments encounter the surface into which the screw is being driven. The increased resistance notifies the operator of the driving tool that an appropriate depth and pressure have been obtained.

Preferably, the washer used with the screw has an inner diameter surface which is fully radiused. The inner diameter surface has a number of projections or bumps which serve to hold the washer in place on the screw prior to mounting or driving and also keep the washer appropriately centered with respect to the screw shank. In a preferred embodiment, these projections are rounded and semi-ovular. The continuous smoothness resulting from the fully radiused configuration helps to prevent catching and tearing of the washer along the inner diameter surface.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DESCRIPTION OF THE PREFERRED EMBODIMENT

Figure 1:
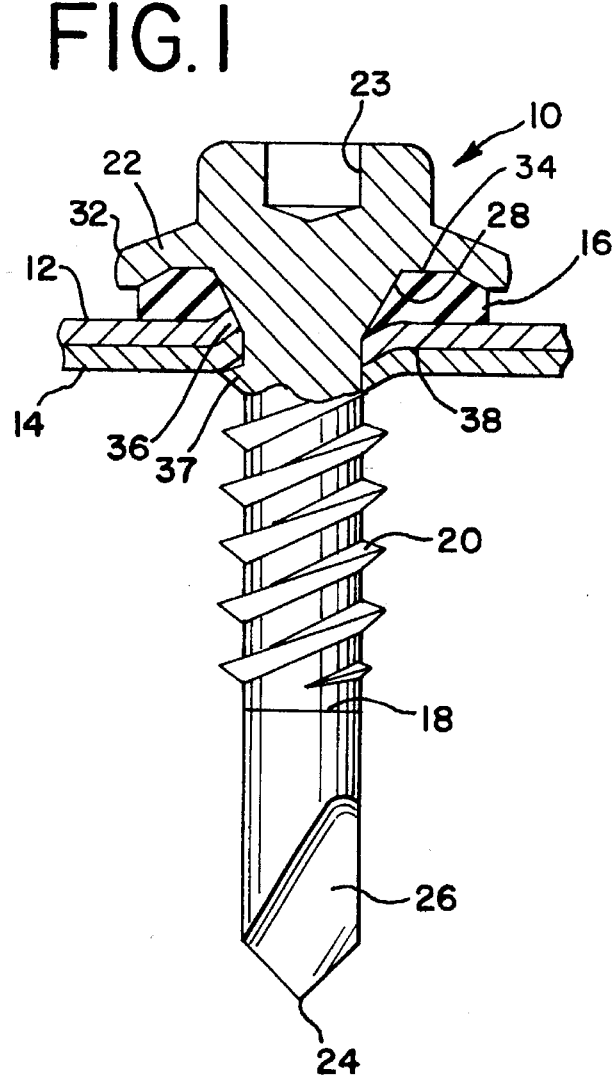
FIG. 1 is a view of a preferred embodiment of a screw with a washer and shown in partial cross-section when fully driven into two sheets of material.
Figure 2:
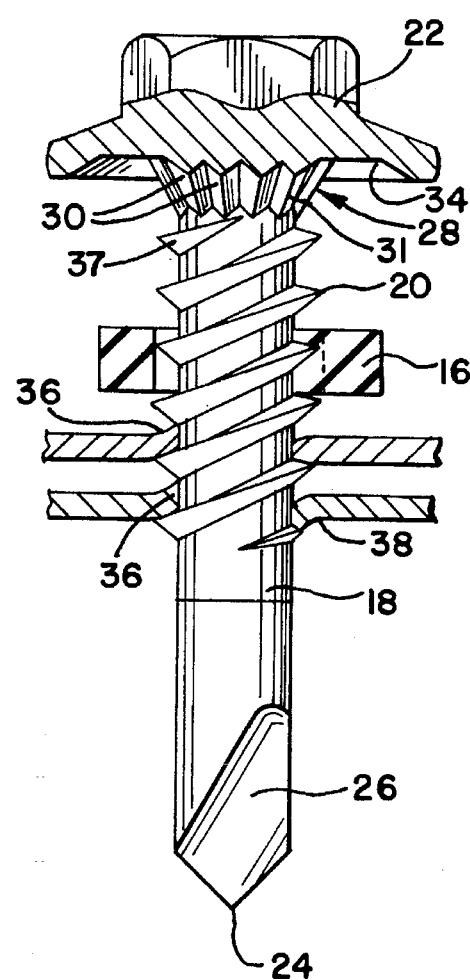
FIG. 2 is a view of the preferred embodiment of the screw and washer of FIG. 1 shown in partial cross-section and shown partially driven into two sheets of material.
Figure 3:
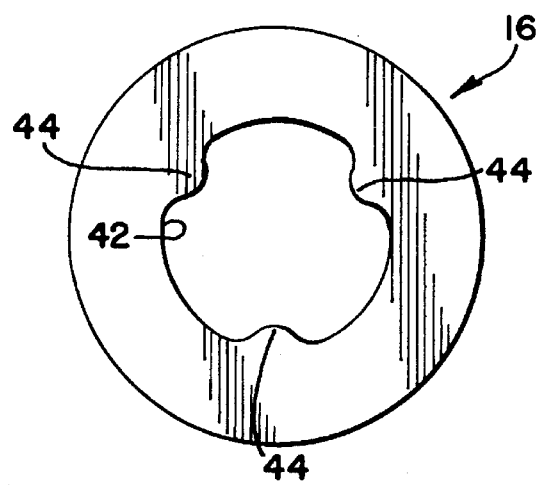
FIG. 3 is a top view of the washer used in the preferred embodiment of the screw and washer combination of FIG. 1.

Referring now to FIGS. 1–3, a preferred embodiment of the present screw for use with a washer is generally designated by the reference numeral 10. In FIG. 1, the screw 10 is shown fully driven into two sheets of material 12 and 14 so as to fasten the sheets together. Additionally, a washer 16 is trapped between the screw head 22 and the top sheet of material 12. In this position the screw 10 and washer 16 form a seal with the top sheet 12.

As is best seen in FIG. 2, the screw includes an elongated shank 18 bearing a thread 20. Any suitable process may be used to form the screw and thread. Preferably the screw 10 is formed from a blank and the thread is formed by a thread rolling operation.

The particular dimensions of the screw 10 including the thread 20 may be changed to suit a particular application. The overall longitudinal length of the screw 10, the diameter of the shank 18, and the dimensions and spacing of the threads may be adapted to a particular application of the screw 10 with washer 16. The factors which may affect these dimensions include the thickness of the sheets 12 and 14, the type of material of the sheets 12 and 14 as well as the amount of force exerted by outside conditions on the sheets 12 and 14, the washer 16 and the screw 10.

Still referring to FIG. 2, the screw 10 also includes a head 22 at one end of the shank 18. In the illustrated embodiment, the head 22 presents a hexagonal shape for engagement with a driving tool, as well as a recess 23 (best seen in FIG. 1) for possible use with a centering device of a suitable driving tool (not shown). However, the shape may be changed to adapt to the particular type of driving tool used, as is well known in the art.

In the preferred embodiment, at the opposite end of the shank 18 from the head 22 is a tip 24 including a self drilling cutout 26. The cutout 26 cuts into the sheets 12 and 14 so that the screw 10 may be driven into the sheets 12 and 14 without predrilling of the sheets. It is also contemplated that a tip may be provided to the shank which is configured for use with predrilled pilot holes, and such tips are well known in the art.

Adjacent to the head 22, the shank 18 includes an enlarged portion 28 in the form of a chamfer bearing a number of ridges 30. The enlarged portion 28 is generally frusto-conical in shape.

An advantage of the present screw 10 is that as the operator drills the screw, with washer 16 disposed around the screw shank 18, into the sheets 12 and 14, a generally uniform driving resistance is encountered. However, the enlarged portion 28, including the ridges 30, increases the driving resistance when the top sheet 12 is contacted by the enlarged portion 28 and ridges 30. The increased resistance gives the operator of a driving tool a clear indication that the desired depth has been reached. Thus, even if the operator is not using a torque setting or similar attachment on the driving tool, the screw may be appropriately positioned as shown in FIG. 1.

In the illustrated embodiment, the enlarged portion 28 is frusto-conical in shape, and the ridges 30 are V-shaped or triangular in cross-section. In the preferred embodiment, the ridges 30 are spaced at equally divided regular angular intervals along the enlarged portion 28 of the shank 18. Of course, other shapes and spacings which provide increased driving resistance are also suitable, including but not restricted to radiused ridges. The triangular ridges 30 in the preferred embodiment present edges 31 to the upper sheet 12 that give good increased resistance to further driving of the screw 10.

Variation of ridge size and the number of ridges may predictably alter the amount of additional resistance provided. Large ridges will provide greater increased resistance than small ridges. Similarly, more numerous ridges will provide greater increased resistance than a smaller number of ridges.

The orientation of the ridges will also affect the amount of additional resistance provided. In the preferred embodiment, each of the ridges 30 terminate with an edge 31. This edge 31, if projected, obliquely intersects the main longitudinal axis of the screw 10. Such an arrangement provides good drilling resistance, since the edge 31 is placed at a right angle to the direction of rotational movement of the screw 10.

Additionally, the illustrated orientation also provides good screw strip-out resistance torque. Strip-out resistance is the tendency of the screw to oppose forces which tend to rotate or pull the screw out of the sheets 12 and 14. This tendency of the screw 10 to unthread in response to external conditions and movement of the sheets 12 and 14 is opposed by any portion of each individual edge 31 of the ridges 30 which contacts the surface of sheet 12.

Referring again to FIG. 1, the washer 16 is positioned properly between a flange 32 of the screw head 22 and the top sheet of material 12. In the preferred embodiment, the flange 32 defines an annular undercut or recess 34 for facilitating the retention of the washer 16. Enlarged portion 28 slopes inward from the recess 34 to the shank 18. The area at which the enlarged portion 28 terminates on the shank 18 generally corresponds to an appropriate fully driven depth for the screw 10 to exert a desired amount of pressure upon the washer 16.

FIG. 1 also illustrates the fact that the driving of the screw 10 into the top sheet 12 results in an upwardly bent portion 36 of the top sheet 12, the upwardly bent portion 36 being forced upwardly by an uppermost portion 37 of the thread 20 which draws the bent portion 36 against the washer 16. On the opposite side of the shank 18, a downwardly bent portion 38 is formed in the upper sheet 12 by the downward force of the thread 20.

As will be appreciated by those skilled in the art, the upwardly bent portion 36 firmly abuts the washer 16 when the screw 10 is in place. Similarly, the portion of the thread 20 immediately above the downwardly bent portion 38 abuts the washer 16. However, if the screw is driven too far into the sheet 12, the pressure exerted upon the washer 16 by the screw head 22 may be sufficient to cause the upwardly bent portion 36 to tear into the washer. The same pressure may be sufficient to cause the portion of the thread immediately above the downwardly bent portion 38 to tear into the washer 16.

Such tearing of the washer 16 breaches the integrity of the washer 16 and may even cause a complete fracture through the washer 16. The tearing or ripping leaves the seal formed by the washer 16 vulnerable to moisture penetration. As was discussed above, moisture penetration may lead to serious problems in any number of applications. However, according to the present invention, the increased driving resistance caused by the enlarged portion 28 of the shank 18 and ridges 30 gives notice to an operator who is driving the screw 10 that an appropriate depth has been reached.

Referring now to FIG. 3, the washer 16 for use with the screw 10 is shown in more detail. The washer 16 has an inner diameter surface 42 which surrounds the screw shank 18 as illustrated in FIGS. 1 and 2. Included on the inner diameter surface 42 is at least one generally radially extending projection or bump 44. In the preferred embodiment three such projections 44 are shown. These projections 44 allow the washer 16 to be easily mounted upon the screw 10, and will hold the washer 16 in place prior to its screw 10 being driven into the sheets 12 and 14. This allows the screw 10 to be sold and distributed with the washer 16 in place while allowing easy assembly of the screw 10 and washer 16 since little force is required to slip the washer 16 over the screw shank 18 and threads 20. The pre-assembly of the washer 16 and screw 10 allows a person who is installing the screw 10 and washer 16 to work more efficiently.

In accordance with another aspect of the present invention, the inner diameter surface 42 including the projections 44 is fully radiused, and is devoid of any abrupt angular surfaces which may promote tearing or ripping of the washer 16. The projections 44 are also preferably fully radiused or rounded and therefore no sharp edges are present on the inner diameter surface 42.

Sharp edges have a tendency to catch on the screw thread 20 when the washer 16 is mated with the screw 10 and during driving of the screw 10 into the sheets 12 and 14. That type of catching frequently leads to tearing of the washer 16 which impairs the integrity of the washer 16 and may adversely affect the ability of the screw 10 and washer 16 to act as a seal when fully driven into the sheets 12 and 14.

In the illustrated embodiment, the projections 44 are semi-ovular in shape and are spaced at regular angular intervals equally dividing the inner diameter surface 42. Further, the projections 44 are preferably fully radiused. Other projection shapes and locations may be used in accordance with the present invention as long as the smoothness of the inner diameter surface 42 is maintained.

In the preferred embodiment, the regular spacing of the projections 44 along equally divided intervals helps to maintain centering of the washer 16 with respect to the main longitudinal axis of the screw 10. When spaced in that fashion, the projections 44 exert mutually opposing forces upon the screw shank 18 to help maintain centering of the washer 16. Centering of the washer 16 in the fully driven position of FIG. 1 provides the most effective seal, since the contact areas that the washer 16 maintains with the screw 10 and top surface 12 are constant around the entire circumference of the shank 18.

While a particular embodiment of the screw 10 for use with washer 16 has been shown and described, it will be appreciated by those skilled in the art that changes and modifications may be made thereto without departing from the invention in its broader aspects and as set forth in the following claims.

What is claimed is:

1. In combination, a screw and a washer, comprising:

a washer for providing a seal with respect to a member with which said washer is to be operatively associated when said washer is mounted upon such a member;

a screw having an elongated shank having a head end and a tip end; a head having a flange defining a recess which retains said washer, said head being disposed at said head end of said elongated shank for engagement with a driving tool; said shank having an enlarged section adjacent to said recess; and a thread extending along a substantial portion of said elongated shank; and substantially uniform impeding means disposed equiangularly upon said enlarged section of said elongated shank for engaging a surface of a member into which said screw is to be driven and thereby increasing the driving resistance of said screw such that said screw is able to be fully driven into the member to an appropriate depth without adversely affecting said washer whereby the sealing integrity of said washer with respect to the member is preserved.

2. The combination according to claim 1 wherein said enlarged section of said shank comprises a frusto-conical chamfer.

3. The combination according to claim 2 wherein said impeding means comprises at least one ridge disposed on said enlarged section of said shank.

4. The combination according to claim 1 wherein said impeding means comprises at least one ridge disposed on said enlarged section of said shank.

5. The combination according to claim 4 wherein said impeding means comprises a plurality of ridges disposed on said enlarged section of said shank.

6. The combination according to claim 5 wherein said ridges are disposed at regular angular intervals.

7. The combination according to claim 5 wherein said ridges extend on said enlarged section of said shank obliquely with respect to a longitudinal axis of said shank.

8. The combination according to claim 4 wherein said washer surrounds said shank adjacent to said head and includes radially extending projections disposed along an inner diameter surface of said washer.

9. The combination according to claim 8 wherein said inner diameter surface of said washer is fully radiused.

10. The combination according to claim 8 wherein said projections of said washer are radiused.

11. The combination according to claim 10, wherein:

said projections of said washer are disposed at regular angular intervals along said inner diameter surface of said washer.

12. A screw and washer combination, comprising:

a washer for providing a seal with respect to a member with which said washer is to be operatively associated when said washer is mounted upon such a member; and a screw having an elongated shank having a head end and a tip end; a head having a flanged portion defining a recess therein which accommodating and retain said washer therewithin, and being disposed at said head end of said elongated shank for engagement with a driving tool; a self-drilling tip disposed at said tip end of said elongated shank; a thread extending along a substantial portion of said shank; and enlarged means, interconnecting said recess of said head and said threaded portion of said shank, having a predetermined axial extent, and having a diametrical extent which is greater than the diametrical extent of said thread disposed upon said shank, for engaging a surface of a member into which said screw is to be driven and thereby increasing the driving resistance of said screw when said screw is driven into the member such that said screw is able to be fully driven into the member to an appropriate depth wherein said flanged portion of said head will be axially spaced from the member into which said screw is driven such that said washer is not adversely affected whereby the sealing integrity of said washer with respect to the member into which said screw is driven is preserved.

13. The combination as set forth in claim 12, wherein:

said enlarged means comprises an enlarged section of said elongated shank having impeding means defined upon a surface of said enlarged section for increasing said driving resistance of said screw.

14. The screw and washer combination according to claim 13 wherein said enlarged section comprises a frusto-conical chamfer.

15. The screw and washer combination according to claim 14 wherein said impeding means comprises at least one ridge disposed on said surface of said enlarged section.

16. The screw and washer combination according to claim 13 wherein said impeding means comprises at least one ridge disposed on said surface of said enlarged section.

17. The screw and washer combination according to claim 16 wherein said impeding means comprises a plurality of ridges disposed at regular angular intervals on said surface of said enlarged section.

18. The screw and washer combination according to claim 17 wherein said ridges are V-shaped.

19. The screw and washer combination according to claim 17 wherein said ridges extend on said surface of said enlarged section obliquely with respect to a longitudinal axis of said shank.

20. The screw and washer combination according to claim 16 wherein said washer surrounds said shank adjacent to said head and includes projections disposed along an inner diameter surface of said washer.

21. The screw and washer combination according to claim 20 wherein said inner diameter surface including said projections is fully radiused.

22. The screw and washer combination according to claim 20 wherein said projections are radiused.

23. A screw and washer combination according to claim 20 wherein said projections are disposed at regular angular intervals along said inner diameter surface.

* * * * *